United States Patent
Iwagaki et al.

[11] Patent Number: 5,721,963
[45] Date of Patent: Feb. 24, 1998

[54] CAMERA WITH SPECIFIC EXPOSURE VALUE AND VIEWFINDER FIELD RATIO RANGES

[75] Inventors: Masaru Iwagaki; Yoshitaka Yamada, both of Hino, Japan

[73] Assignee: Konica Corporation, Japan

[21] Appl. No.: 779,886

[22] Filed: Nov. 27, 1996

Related U.S. Application Data

[63] Continuation of Ser. No. 333,864, Nov. 3, 1994, abandoned, which is a continuation of Ser. No. 404, Jan. 4, 1993, abandoned.

[30] Foreign Application Priority Data

Jan. 16, 1992 [JP] Japan ............................ 4-005854
Jan. 21, 1992 [JP] Japan ............................ 4-008688

[51] Int. Cl.[6] ............................ G03B 13/02; G03B 17/02
[52] U.S. Cl. ............................ 396/6; 396/382; 396/535
[58] Field of Search ............................ 396/6, 155, 200, 396/373, 375, 377, 378, 382, 452, 505, 535

[56] References Cited

U.S. PATENT DOCUMENTS

| | | | |
|---|---|---|---|
| 4,118,717 | 10/1978 | Shoupp et al. | 354/43 |
| 4,256,396 | 3/1981 | Kawaguchi et al. | 354/222 |
| 4,571,043 | 2/1986 | Kobayashi et al. | 354/202 X |
| 4,592,636 | 6/1986 | Kato et al. | 354/225 |
| 4,887,109 | 12/1989 | Fujita et al. | 354/222 |
| 5,181,057 | 1/1993 | Takagi et al. | 354/94 |

FOREIGN PATENT DOCUMENTS

| | | |
|---|---|---|
| 189981 | 8/1986 | European Pat. Off. . |
| 2200760 | 8/1988 | United Kingdom . |
| 2247754 | 3/1992 | United Kingdom . |

*Primary Examiner*—Safet Metjahic
*Assistant Examiner*—J. K. Han
*Attorney, Agent, or Firm*—Jordan B. Bierman; Bierman, Muserlian and Lucas

[57] ABSTRACT

A camera including a photographing lens and a finder to provide a viewing image field through which an object can be observed. The field ratio of the viewfinder field to the photographed image field on the film is 87% to 120% and the exposure value of the camera is 11 to 13.5.

9 Claims, 7 Drawing Sheets

PROCESS : C41
DENSITY MEASURMENT : STATUS M
DENSITY : MINIMUM DENSITY + 1.0

① BLUE-SENSITIVE LAYER
② GREEN-SENSITIVE LAYER
③ RED-SENSITIVE LAYER

FIG. 6b

① BLUE-SENSITIVE LAYER

② GREEN-SENSITIVE LAYER

③ RED-SENSITIVE LAYER

CAMERA WITH SPECIFIC EXPOSURE VALUE AND VIEWFINDER FIELD RATIO RANGES

This application is a continuation of Ser. No. 08/333,864, filed Nov. 3, 1994, now abandoned, which is a continuation of Ser. No. 08/000,404, filed Jan. 4, 1993, now abandoned.

BACKGROUND OF THE INVENTION

The present invention relates to a film unit with a lens which can be used to take photographs immediately because a film (a silver halide color photosensitive material) is loaded in it in the exposable state beforehand.

So-called film units with a lens (hereinafter called this camera) which are sold as simple plastic cameras with a silver halide color photosensitive material loaded have come into wide use recently. Those film units with a lens eliminate troublesomeness of loading a film in an ordinary camera and failures caused by misloading of a film and increase photographing chances due to simplicity. Film units with a lens having a stroboscope, telescopic type units, or very wide angle type units have been developed and put to practical use according to photographing purposes.

A film unit with a lens is a simple camera wherein a photosensitive material is loaded by the manufacturer beforehand as is generally known. A user uses the camera only for exposing the one loaded photosensitive material and the film unit with a lens is sent to a photofinishing laboratory with the photosensitive material loaded after end of exposure. Therefore, the camera is structured very simply and made lower in price.

Therefore, those film units with a lens aim at low costs, so that the drive system, optical system, and electrical system are extraordinarily simplified unlike ordinary cameras and there are many unsatisfactory points in development finishing and print quality, which are required to be modified.

As to the finder, a transparent and so-called frame type finder is used in consideration of low costs. The main purpose of this finder of a film unit with a lens is to confirm the rough center position of an object and the finder field rate is about 60 to 70%.

Therefore, when a camera man holds a film unit with a lens by looking in at the finder and allows an object to be photographed to be entirely put within the finder, the distance from the camera to the object is unnecessarily long and the camera man is not satisfied with the printed result because the size of the photographed object is small beyond his expectation. It is true that as an object becomes small, the visual image quality lowers. When a film integrated camera with a built-in stroboscope is used, an object is photographed at an unnecessarily long distance using the stroboscope and the light quantity becomes insufficient often.

On the other hand, when the field rate is only increased, the photographing range intended by a user cannot be obtained. This is generally referred to as "Image Missing" which has a disadvantage that the head or legs of a person are partially off the image area and the photograph is an unpleasant one for him.

Furthermore, these film units with a lens are designed so that even a simple lens can be focused on an object by increasing F-number. However, since the sensitivity is not sufficient, films with ISO sensitivity of at least 320 are generally used. Even when a stroboscope is built in a film unit with a lens, underexposure photographs are often obtained depending on the photographing scene and users are not satisfied with it.

Although there is a proposal that a super sensitive film is loaded, the image quality is not sufficient for general use. When F-number is only reduced or the stroboscope guide number is only increased, the image quality is left unsatisfied and there is a disadvantage that the balance between under, normal, and over exposures at daylight photographing and night photographing is lost.

SUMMARY OF THE INVENTION

A first object of the present invention is to provide a film unit with a lens which is a simple camera but has a small probability of underexposure independently of a strobe and takes photographs of high image quality which users can be satisfied with.

The above first object of the present invention is accomplished by a film unit with a lens which has a fixed focus, fixed F-number, fixed shutter speed, and finder and is loaded with an unexposed film in the exposable state beforehand, wherein the focal length of the exposure lens ranges from 20 mm to 35 mm and the finder field rate ranges from 87% to 120%.

According to the present invention, the focal length of the exposure lens ranges from 20 mm to 35 mm, desirably from 25 mm to 34 mm, or particularly desirably from 27 mm to 33 mm. According to the present invention, it is not desirable that the focal length is shorter or longer than the minimum or maximum value. The lens system may consist of a single lens or two or more lenses. Furthermore, according to the present invention, the use of a non-spherical lens increases the effect.

The finder field rate is a percentage of the viewing image field in the finder to the effective image field formed on a photosensitive material. The field rate of a fixed finder varies with the photographing distance. However, according to the film unit with a lens of the present invention, the field rate for an object (an object distance of 2 m) at a distance with a maximum photographing frequency ranging from 1 m to 3 m is assumed as a finder field rate. Although the field rate varies with the view point position, it is assumed that the view point is on the optical axis of the finder.

An ordinary film unit with a lens is designed so that an image field wider than the viewing image field in the finder which is confirmed by a camera man is formed on a photosensitive material as an image. Therefore, the field rate of the conventional exposure unit is often less than 85%.

The field rate of the film unit with a lens of the present invention ranges from 87% to 120% or desirably 90% to 110%. When the field rate is more than 100%, it is desirable to put a mark for indicating the photographed image field (effective image area) in the finder. When the field rate is more than 120%, the exposure area in the finder becomes too small and the object undesirably cannot be seen easily. To realize the field rate of the present invention, it is desirable to mount at least one concave lens in the finder or it is desirable to use two or more inverted Galilean lenses. It is visually desirable that the finder magnification ranges from 0.4 to 0.7 times or particularly from 0.4 to 0.5 times.

A second object of the present invention is to provide a film unit having no probability of underexposure similar to the first object, even when the film unit is equipped with a strobe. The second object is accomplished by a film unit with a lens which has a fixed focus, fixed F-number, fixed shutter speed, and built-in stroboscope and is loaded with an unexposed film in the exposable state beforehand, wherein the exposure value (EV) of the film unit with a lens ranges from 11 to 13.5 and the guide number of the stroboscope ranges from 10 to 15.

According to the present invention, the exposure value ranges from 11 to 13.5, desirably from 12 to 13.3, or particularly desirably from 13 to 13.3.

According to the present invention, the exposure value is the same as the general definition and a value for indicating the ability for passing the light quantity using the F-number (F) and shutter speed (T sec) as shown below.

$$2^{EV}=F^2/T$$

An appropriate exposure value is determined by the brightness of an object and the sensitivity of a film (photosensitive material). Since the film unit with a lens of the present invention is an exposure unit wherein an unexposed film with particular sensitivity is loaded in the exposable state beforehand, the exposure value can be set so that photographs which users can be satisfied with can be obtained.

F-number and shutter speed for determining the exposure value within the range of the present invention are as shown below.

According to the present invention, fixed F-number is 5.6 or more, desirably between 8.5 and 11, or particularly desirably between 9.0 and 10.5. The shutter speed ranges desirably from 1/50 to 1/250 seconds or particularly desirably from 1/80 to 1/125 seconds. To obtain the above exposure value of the present invention, the above fixed F-number F and shutter speed T can be properly combined.

According to the present invention, the ISO sensitivity of an unexposed film which is loaded in the exposable state beforehand ranges desirably from 200 to 1000 or particularly desirably from 320 to 800.

Furthermore, according to the present invention, the guide number $G_{NO}$ of the stroboscope ranges from 10 to 15, desirably from 11 to 15, or particularly desirably from 11 to 14. The guide number of the stroboscope can be adjusted by changing the light emission tube, capacitor, and transformer. According to the present invention, it is not desirable that the stroboscope guide number is too large or small.

BRIEF DESCRIPTION OF THE DRAWINGS

FIG. 6 shows spectral sensitivity curves of a photosensitive material. FIG. 6(a) shows a preferable example of the present invention.

DETAILED DESCRIPTION OF THE PREFERRED EMBODIMENT

Figure 1:
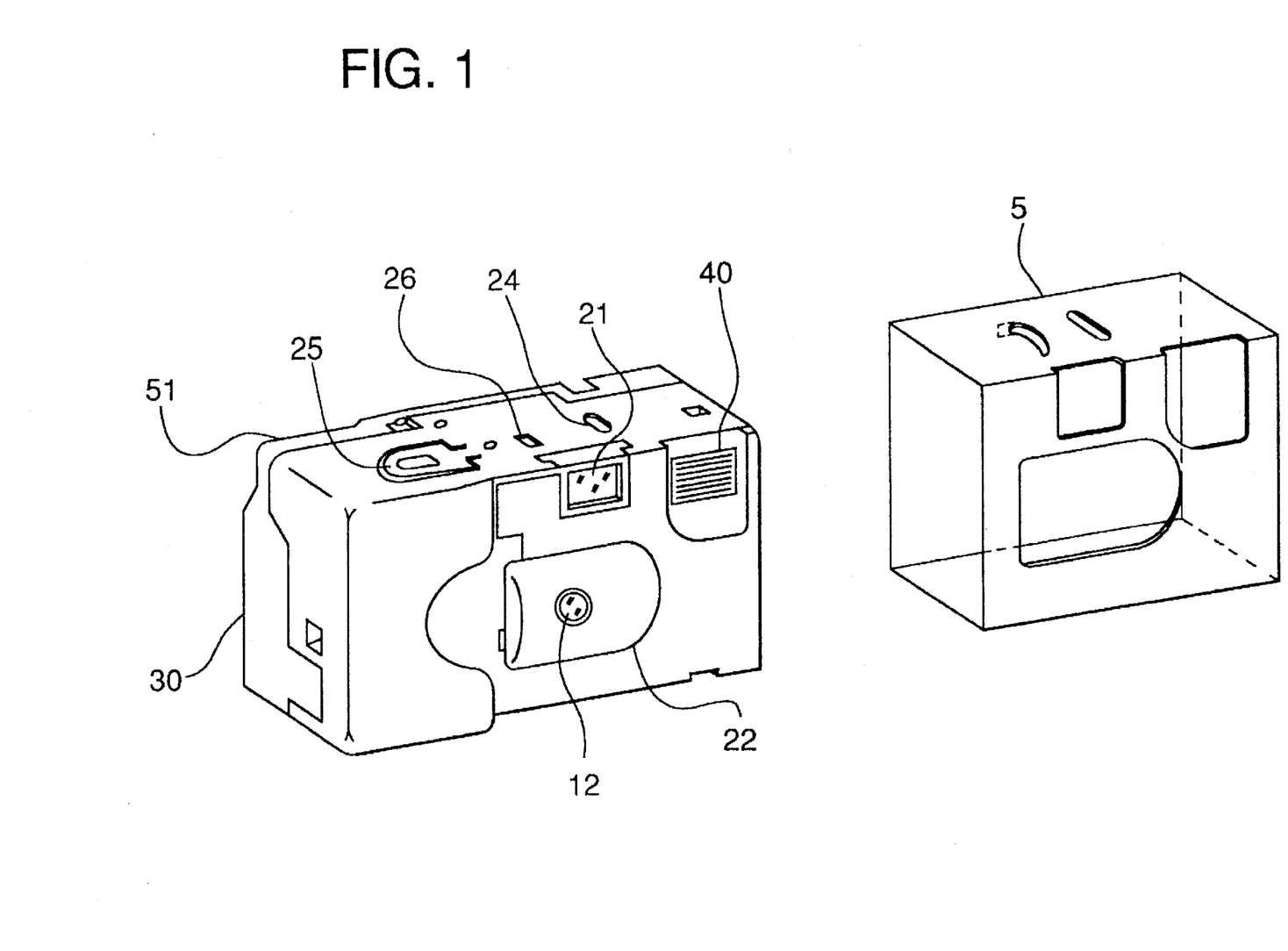
FIG. 1 is a perspective view of an embodiment of the film unit with a lens of the present invention.

FIG. 1 shows an appearance of the film unit with a lens of the present invention. This camera is loaded with a 35 mm film (J135) beforehand and sent to the manufacturer with the film stored in the camera without being rewound after the end of photographing. The film is taken out from the camera and developed and printed.

An unexposed film which is used by this camera has ISO sensitivity ranging from 320 to 800 (the ISO sensitivity in this embodiment is 400) and is loaded in the camera in the state that it is wound round a spool and wound in the cartridge by a winding mechanism whenever it takes a photograph. Therefore, the manufacturer can take out an exposed film from a camera in a light room.

An exposed film can be taken out easily from a camera by bending a part of the back cover. Therefore, by checking the camera mechanism, loading a new unexposed film, and replacing the back cover, the camera can be used once again.

The cartridge and spool mounted in this camera are small in outer diameter compared with a generally used cartridge (JIS K 7528) and spool such that the outer diameter of the cartridge is 20.6 mm and the spool diameter is 9 mm.

Therefore, the total thickness of the camera can be controlled to 24 mm or so and a very thin compact camera can be realized.

A thick paper cover indicating the brand name and simple use method is put on a part of the outer surface of the above camera.

Figure 2:
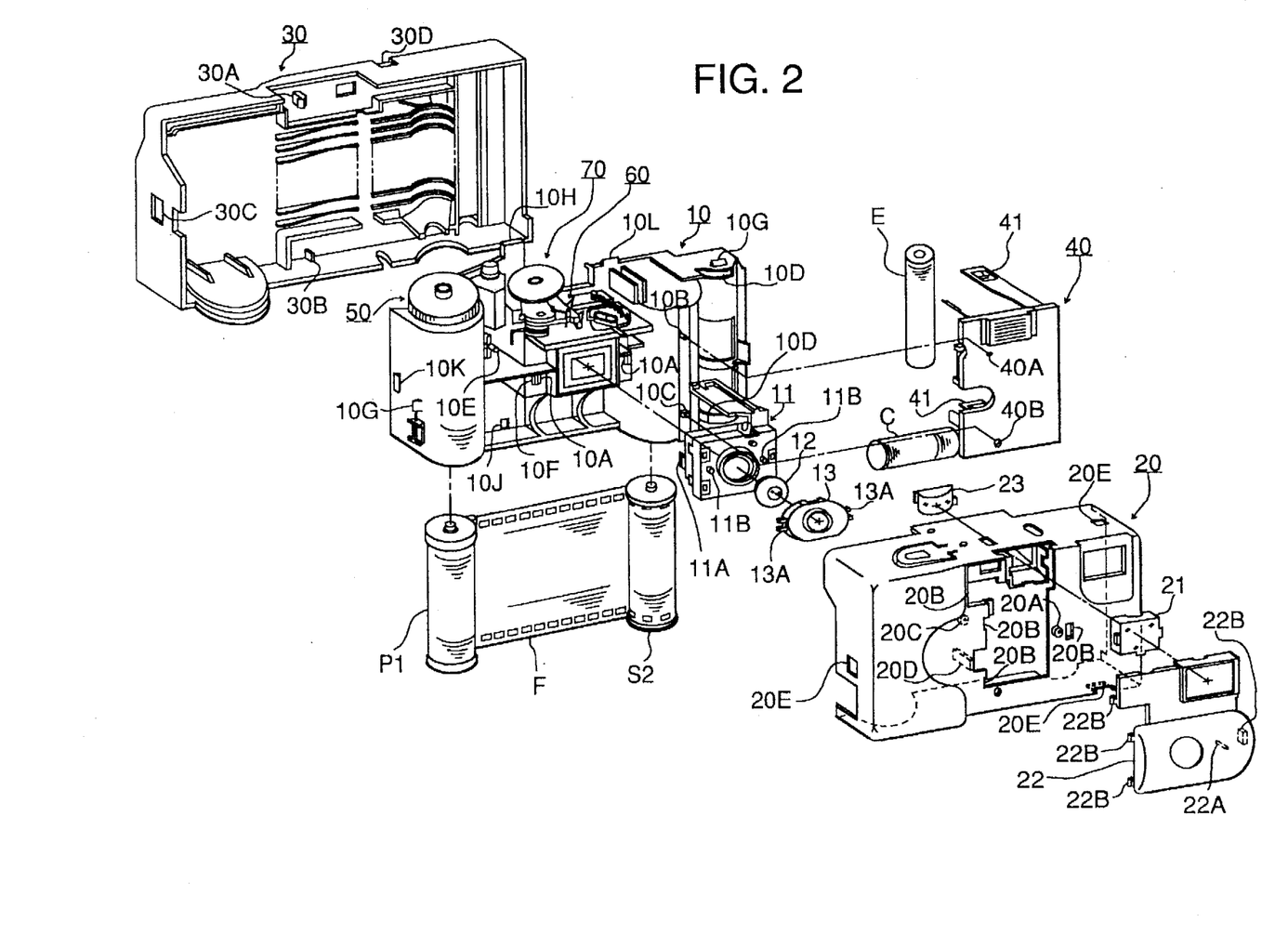
FIG. 2 is an exploded perspective view of the entire structure of the embodiment shown in FIG. 1.

FIG. 2 is a development showing the structure of this camera.

Numerals 10, 20, and 30 indicate a camera body, front cover, and back cover respectively which are essential components of this camera, 40 a stroboscope unit which is to be built in, and 50 a film winding unit.

The above camera body 10 is equipped with members which constitute the film winding unit 50 and a shutter case 11 containing a shutter blade.

The above shutter case 11 is fixed by joining protruded pawls 11A on both sides thereof to joints 10A on the front of the camera body 10 and connects the shutter blade to the film winding unit 50.

Furthermore, on the front of the above shutter case 11, an exposure lens 12 which is a single lens with a focal length f ranging from 20 mm to 35 mm, desirably from 25 mm to 34 mm, or particularly desirably from 27 mm to 33 mm (f=30 mm in this embodiment) and with a fixed F-number of F 9.5 is fitted and covered by a lens holder 13 having slots 13A which are joined to guide pins 11B.

The above camera body 10 and shutter case 11 including the aforementioned front cover 20 and back cover 30 are formed by a black and matte plastic material which is slightly elastic.

On the other hand, the above stroboscope unit 40 is mounted and supported on the basis of holes 40A and 40b of a substrate which are joined to guide pins 10B and 10C respectively on the front of the camera body 10.

In the above stroboscope unit 40, upper and lower integrated battery connection pieces 41 are protruded into a battery chamber on the back of the camera body 10 through upper and lower slits 10D of the camera body 10 and hold a power supply battery E which is an AM 3 battery as a power source for charging the stroboscope.

An integrated main capacitor C is stored in a capacitor chamber which is formed under the above shutter case 11.

When the above front cover 20 is mounted to the camera body 10, the above lens holder 13 and stroboscope unit 40 are fixed to the camera body 10 integratedly.

Before mounting the above front cover 20 to the camera body 10, an object lens 21 which is a concave less of the finder is fitted on the front thereof and fixed by joining a decorative cover 22. The above decorative cover 22 has a guide pint 22A and four pawls 22B which are protruded from the back thereof and they are joined to a hole 20A and four joints 20B on the front of the front cover 20 respectively.

The above front cover 20 is joined to an eye lens 23, which is a convex lens of the finder, on the back and then mounted on the front of the camera body 10.

The finder object lens 21 and eye lens 23 constitute an inverted Galilean finder, and the optical axis of the exposure lens 12 and the optical axis of the finder cross each other at a distance of 2 m from the camera, and the field rate is set between 90% and 110%. It is needless to say that the above optical axes may be set in parallel.

The field rate is required to be set within the range of 87 to 120%. Preferably, it is desirable to set it between 90% and 110% as mentioned above.

The above front cover 20 is equipped with a hole 20C, pawl 20D, and three joints 20E on the back thereof and they are joined to a guide pin 10E and pawl 10F on the front of the camera body 10 and to joints 10G on the side respectively.

By the connection unit of the above front cover 20 to the camera body 10, the above lens holder 13 and stroboscope unit 40 are fixed to the camera body 10. The guide number $G_{NO}$ of the stroboscope unit 40 to be built in is set between 11 and 14 in this embodiment.

In the cartridge chamber and scroll chamber (both are not shown in the drawing) which are formed on the back of the above camera body 10 whereto the front cover 20 is mounted, a cartridge P1 and spool S2 round which an unexposed film F is wound are mounted.

The above film F is loaded in the camera in the state that the tip thereof is joined to the spool in the cartridge P1 so that it can be wound in the cartridge P1.

The back cover 30 is mounted to the back of the above camera body 10 wherein the film F is loaded and the light shielding for the above film F and control to the focal plane position can be retained.

The above back cover 30 is equipped with pawls 30A and 30B on the front and joint holes 30C and 30D on the sides. When mounting the back cover 30 to the camera body 10, the pawls 30A and 30B are joined to joints 10H and 10J of the camera body 10 and the holes 30C and 30D are joined to pawls 10K and 10L of the camera body 10 so as to fix the back cover 30.

Next, the above film winding mechanism 50, a sector charger mechanism 60, and a film counter mechanism 70 will be explained in detail.

Figure 3:
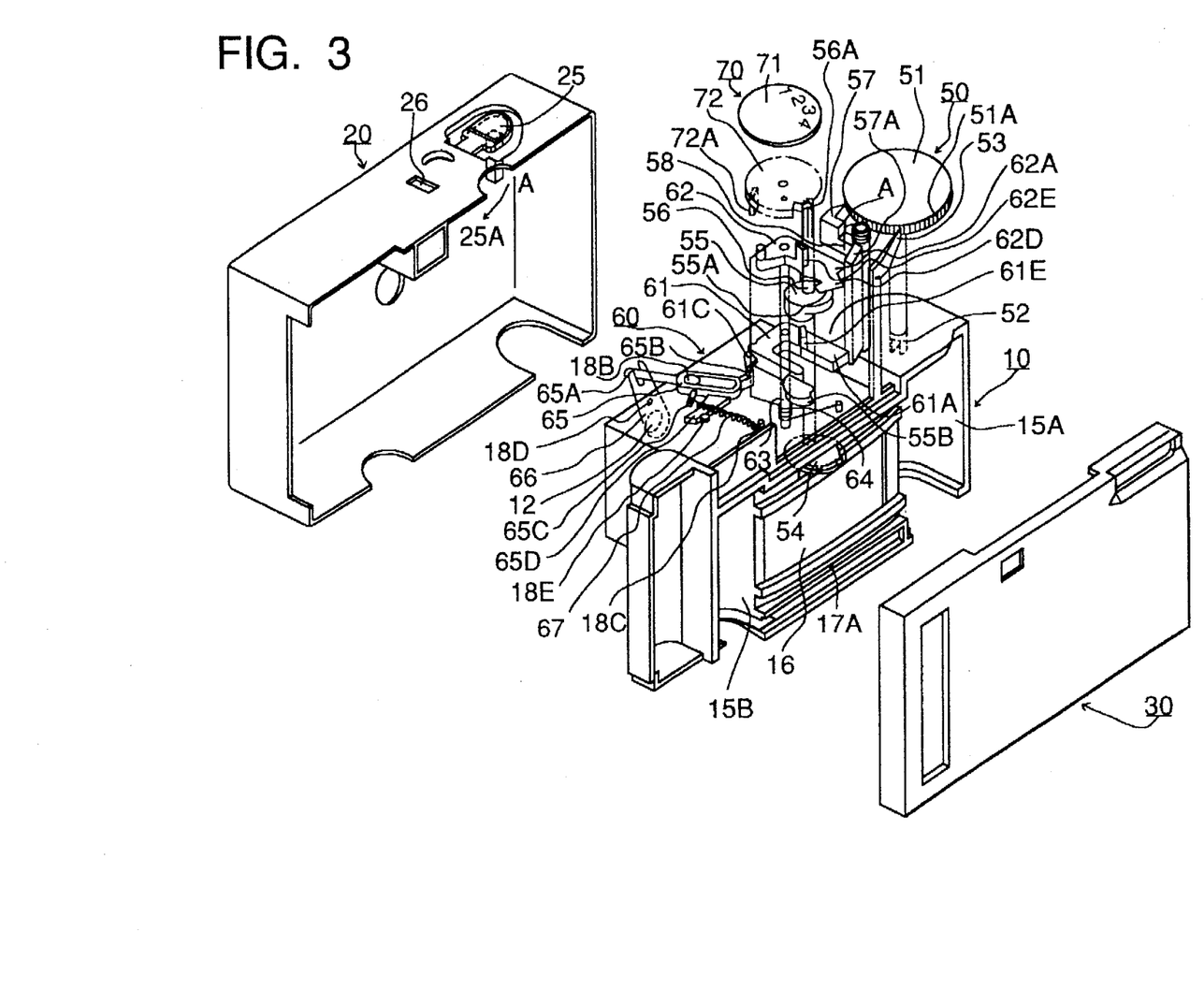
FIG. 3 is an exploded perspective view of the mechanism of the embodiment shown in FIG. 1.
Figure 4:
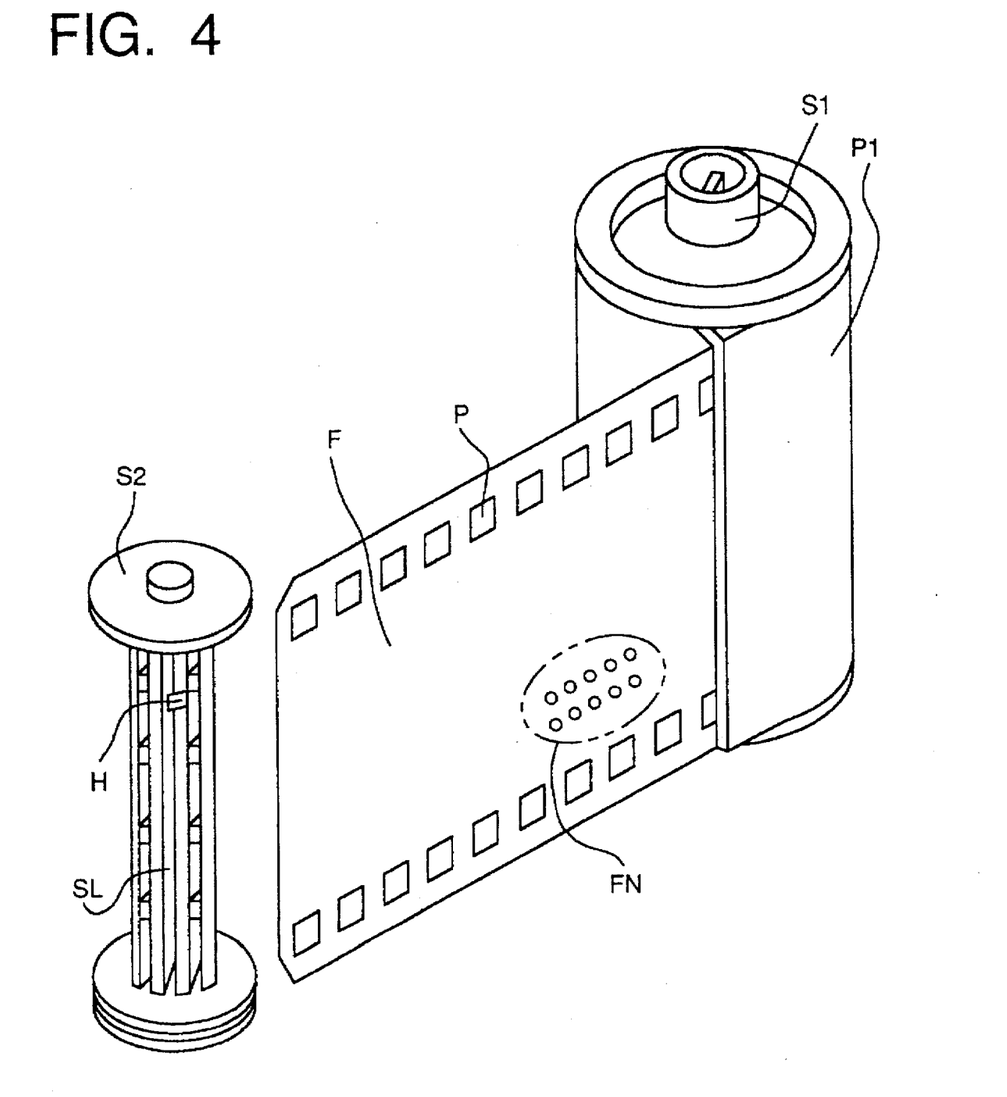
FIG. 4 is a perspective view of a film and cartridge which are used in this embodiment.

FIG. 3 shows the above mechanisms at the angle when they are viewed from the back of this camera and FIG. 4 shows a film and cartridge which are to be loaded in this camera.

In FIG. 3, numeral 10 indicates a unit having a film winding mechanism which is a camera body. The above camera body 10 is equipped with a cartridge chamber 15A and scroll chamber 15B on the same plane on both sides of a picture frame 16 which is an exposure area as two storing chambers for film winding and film loading and a J135 film FL wound in the cartridge P1 shown in FIG. 4 which is a container is loaded.

A film FL used in this camera of this embodiment is a roll film J135 which is fixed to a spool S1 of the cartridge P1, which is a container, at the end thereof in a dark room beforehand and wound in such a length that predetermined frames can be exposed in the same way as with an ordinary camera and a fixed length of the film is protruded from the film outlet of the cartridge P1. The film in the state is loaded in the camera. The loading method will be described hereunder.

The cartridge P1 is mounted in the cartridge chamber 15A so that the spool S1 of the cartridge P1 is joined to the forked part of a winding fork 52. On the other hand, the spool S2 is also inserted into the scroll chamber 15B. According to the present invention, the film FL is pulled out until the top of the film notchers FN of the film FL reaches an index 17A at the lower part of the rail surface which is mounted downward, and the tip of the film FL is inserted into a slit SL of the spool S2, and one of the perforations P of the film FL is joined to one of the pawls H.

Next, the back cover 30 is closed so as to shield light. Then, the camera in this state is mounted to the film winder and the film FL is wound round the spool S2 in the scroll chamber 15B. When the film FL is loaded like this, the film FL is wound in the cartridge P1 frame by frame every exposure. According to the present invention, when the predetermined frames are exposed, two frames are fed without exposure and the exposed film FL is wound in the cartridge P1 with a necessary length left without the tip of the film FL being wound in the cartridge. Therefore, this cartridge can be removed from this camera in a light room.

Next, the mechanism of the camera body will be explained.

In the above camera body 10, major mechanisms such as the film winding mechanism 50 including the exposure lens 12, sector charger mechanism 60, and film counter mechanism 70 are incorporated.

Firstly, the film winding mechanism and sector charger mechanism will be explained.

Numeral 51 indicates a film winding knob. The film FL which is loaded as mentioned above is wound by turning the film winding knob 51 counterclockwise. A cam 55 having a sector cam 55B at the lower part thereof, which is coaxial with a sprocket gear 54 with 8 teeth which are engaged with perforations P of the film FL, makes one revolution counterclockwise when the film is wound.

In other words, the film is advanced a frame every 8 perforations of the film which are equivalent to the 8 teeth of the sprocket gear and the frame size is a so-called full size of 24×36 mm.

When the cam 55 rotates counterclockwise, the sector cam 55B also rotates counterclockwise as mentioned above as a matter of course. During the process, a charge lever 61 is rotated clockwise by the sector cam 55B against the force of a charge lever spring 64 which is applied counterclockwise using a charge lever axis 63 as a rotational axis, and an upstand 65B of a sector lever 65 is pressed by a triangular protrusion 61C mounted to the charge lever 61, and then the sector charge mechanism is charged over the upstand 65B as shown in the drawing.

A sector spring 67 is stretched between a pin 65C of the sector lever 65 and a pin 18C mounted to the camera body 10, and the left end of a slot of the sector lever 65 touches a pin 18B mounted to the camera body 10 for guiding the above slot freely for sliding or rotation by the tension of the sector spring 67, and an arm plate 65D mounted to the sector lever 65 touches a pin 18E mounted to the camera body 10. Furthermore, a sector drive pin 65A for operating a sector 66 which is born by a sector pin 18D mounted to the camera body 10 is inserted into the fork of the sector 66.

As described later, a protrusion 62D of a cam stopper 62 is protruded from a groove 55A of the cam 55 after the end of exposure, and an arm 57A of a winding stopper 57 changes from the status shown in the drawing so as to come off the edges of an arm 61A of the charge lever 61 and of an arm 62A of the cam stopper 62 and is in contact with the end face of the above arm 61A by the force of a winding stopper spring 58 which is applied clockwise. When the cam 55 makes one revolution by film winding as mentioned above and the groove 55A of the cam 55 returns to the initial position, the protrusion 62D of the cam stopper 62 plunges into the above groove 55A by the spring force which is applied to the cam stopper 62 clockwise by the horizontal part at the tip of the charge lever spring 64. By this plunging operation, the Joining of the arm 57A of the winding stopper 57 to the end face of the arm 62A of the cam stopper 62 is released at this time.

The peripheral cylindrical surface of the film winding knob 51 is ratcheted, and the V-shaped protrusion at the tip of the above winding stopper 57 which is released from Joining plunges into one of the wheel grooves of the above ratchet wheel 51A by the above force of the winding stopper spring 58, and the counterclockwise winding rotation of the film winding knob 51 is prevented. In other words, by completion of film winding, the film winding knob 51 is prevented from additional winding rotation.

Furthermore, the tip of a reverse rotation prevention pawl 53 using the elasticity of a plastic material is pressed against the above ratchet wheel 51A of the camera body 10 so as to prevent the film winding knob 51 from rotation in the reverse direction of winding.

When a release button 25 of the front cover 20 is pressed, the tip of a release button pin 25A mounted to the back of the release button 25 moves in the direction of the arrow A. In other words, when the front cover 20 is attached to the camera body 10, by the movement of the tip of the release button pin 25A in the direction of the arrow A marked on the winding knob 51 in the drawing, the winding stopper 57 rotates counterclockwise against the above force of the winding stopper spring 58. The edge of the arm 61A of the charge lever 61 comes off the the end face of the arm 57A of the winding stopper 57 and the charge lever 61 and then the cam stopper 62 rotate counterclockwise by the force of the charge lever spring 64.

By the counterclockwise rotation of the charge lever 61 by the force of the charge lever spring 64 which is stronger than that of the sector spring 67, the above protrusion 61C of the charge lever 61 strikes and comes off the upstand 65B of the sector lever 65. Therefore, the sector lever 65 rotates clockwise round the pin 18B in the slot of the sector lever against the tension of the sector spring 67 and returns to the original position by the tension of the sector spring 67. Therefore, the sector drive pin 65A allows the sector 66 to rotate round the sector pin 18D so as to expose the film and then closes the sector 66.

The shutter speed T by opening and closing the sector 66 is set between 1/80 and 1/125 seconds (1/100 seconds in this embodiment). When the use of the stroboscope is selected, the stroboscope emits light when the shutter is fully opened.

The cam stopper 62 also rotates counterclockwise together with the charge lever 61 and the protrusion 62D of the cam stopper 62 gets out of the groove 55A of the cam 55. When the release button is pressed at this time, the arm 57A of the winding stopper 57 is forced clockwise by the force of the winding stopper spring 58 but stopped by the end face of the arm 61A of the charge lever 61 and the V-shaped protrusion at the tip of the winding stopper 57 does not F-number the ratchet wheel 51A of the winding knob 51. Therefore, the film can be advanced additionally.

Next, the film counter mechanism will be explained.

Numeral 72 indicates an exponential plate gear which is engaged with a V-shaped groove 56A formed at the upper tip of a cam shaft 56 mounted to the cam 55 which rotates integratedly with the sprocket gear 54 as mentioned above and rotates clockwise tooth by tooth whenever the film is advanced a frame and the cam shaft 56 makes one revolution.

An exponential plate 71 is put on the top of the exponential plate gear 72 and the number of remaining exposable frames of the film is displayed in a film counter window 26 on the top of the front cover 20.

A protrusion 72A is mounted at the bottom of the exponential plate gear 72 and by winding the film after all the predetermined frames are exposed, the above protrusion 72A squeezes itself between a protrusion 61E of the charge lever 61 and another protrusion 62E of the cam stopper 62. When the protrusion 72A gets in between the protrusions 61E and 62E, the film is advanced a frame and even if the cam 55 makes one revolution and the sector charging ends, the above protrusions 61E and 62E are prevented from operation by the protrusion 72A of the exponential plate gear 72, and the charge lever 61 cannot operate, and the protrusion 62D of the cam stopper 62 cannot plunge into the groove 55A of the cam 55. The arm 57A of the winding stopper 57 gets into contact with the end face of the arm 62A of the cam stopper 62 by the above force of the winding stopper spring 58, and the V-shaped protrusion at the tip of the winding stopper 57 does not F-number the ratchet wheel 51A, and the film cannot be exposed by operating the charge lever 61 and opening and closing the sector.

When two frames of the film are fed without being exposed in this embodiment in this way, the exponential plate gear 72 rotates two teeth, and the protrusion 72A of the exponential plate gear 72 keeps to press the above protrusion 61E and prevents the charge lever 61 from operation by this rotation but comes off another protrusion 62E of the cam stopper 62. Therefore, the above protrusion 62D plunges into the groove 55A of the cam 55, the joining of the winding stopper 57 is released, the winding knob 51 is stopped by the winding stopper 57, and the film cannot be wound. Since the charge lever 61 is prevented from operation as mentioned above, the film cannot be exposed. The tongue at the tip of the film is prevented from winding into the cartridge like this and the tongue with a necessary length is ensured. Therefore, even if a cartridge with a small outer diameter is used to make the camera smaller, there is no problem in pulling out the film from the cartridge for development.

Figure 5A:
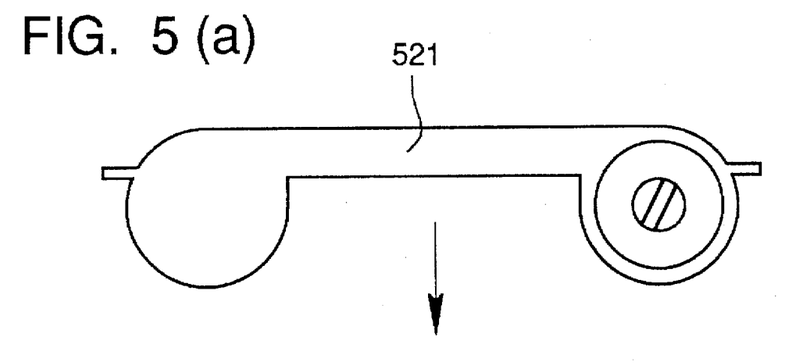
FIG. 5 is a sectional view of another embodiment.
Figure 5B:
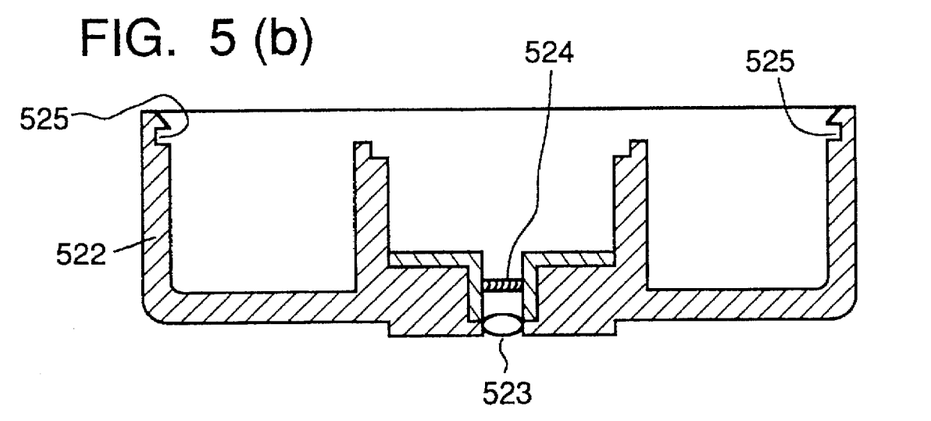

The structure and operation of the film unit with a lens in this embodiment have been explained above. However, according to the present invention, there are no restrictions on the method for winding a color photosensitive material in the cartridge. For example, a method that the unit consists of a camera part (b) and a cartridge part (a) as shown in FIG. 5, and the cartridge part can be removed from or mounted to the camera part, and the cartridge part serves as a back cover for the camera part may be used. In the drawing, numeral 521 indicates a cartridge part having a built-in film, 522 a main body of the exposure unit, 523 an exposure lens, 524 a shutter and fixed F-number, and 525 joints for fixing the above cartridge 521 to the main body 522 of the exposure unit so as to put the camera into the exposable state. The film unit with a lens of such a structure has many advantages such as reuse of the camera part and recycle of the cartridge part.

According to the present invention, as explained in the embodiment, it is desirable to use plastics for the main body of the exposure unit and some parts so as to realize light weight and low cost. Desirable conditions for a plastic are (1) it has high light shielding, (2) it does not affect photographic characteristics of a photosensitive material much, and (3) it can be reused easily. When any well-known plastic agrees with the above requirements, it may be used. Desirable actual plastics are polystyrene, polypropylene, polyethylene, polyvinyl chloride, plymethyl methacrylate, polyethylene terephthalate, and cellulose acetate ester which are added with carbon black or pigment so as to provide light shielding, and polymers thereof.

As a power source for the stroboscope, an ordinary alkanline battery as used in the embodiment or lithium battery may be used. However, it is more desirable to use a battery containing no mercury or chargeable battery so as to prevent environmental pollution due to disuse of used batteries and to minimize problems on reprocessing of used batteries.

It is desirable to use a cover for the film unit with a lens of the present invention as shown in the embodiment.

As a material of the cover, it is desirable to use, for example, paper, sponge, rubber, leather, or cloth so as to absorb a shock. Although any shape of the cover may be used, it is desirable to use a belt type or box type cover or a cover which has holes so as to prevent the functions and operations of the lens, finder, stroboscope, shutter button, and film winder of the exposure unit from difficulties.

It is desirable to keep the film unit with a lens of the present invention in a plastic case or moisture-proof bag air-tightly until it is used after manufacture. The relative humidity in an air-tight case or bag ranges from 30 to 70% at 25° C., desirably from 40 to 60%, or particularly desirably from 45 to 55%. Furthermore, the partial pressure of oxygen may be reduced below the air pressure by charging inert gas.

According to the present invention, a film unit with a lens for obtaining photographs with superior image quality, wherein there is no need to take photographs at an unnecessarily long distance from an object because the field rate is high and the view angle is wide compared with a conventional film unit with a lens, and the visual image quality is not lowered, and the probability of underexposure is, low can be provided.

According to the present invention, a film unit with a lens having a built-in stroboscope for obtaining photographs with superior image quality, wherein the probability of underexposure is low in both daylight photographing and night stroboscopic photographing, can be provided.

According to the present invention, as mentioned above, by combining particular use ranges of the components of a film unit with a lens which has a finder as well as a fixed focus, fixed F-number, and fixed shutter speed and which is loaded with an unexposed film in the exposable state beforehand, that is, of a so-called single use camera, good results can be obtained. Particularly, by combining all of them, a desirable embodiment can be obtained.

An actual example is a film unit with a lens wherein the fixed F-number ranges from 5.6 to 11, and the above finder field rate ranges from 87% to 120%, and the exposure value ranges from 11 to 13.5, and the focal length of the exposure lens ranges from 20 mm to 35 mm.

Next, as a desirable embodiment from another point of view of the present invention, a film unit with a lens having a built-in stroboscope which positively uses characteristics of the stroboscope and of a photographic film loaded as an unexposed photosensitive material beforehand which are fixed will be described hereunder.

There is a problem on the film unit with a lens having a built-in stroboscope that many printed photographs exposed and obtained by the unit show bluish skins of persons. One of the causes is that the color temperature of the stroboscope is high. Although it can be improved by using an ultraviolet ray absorption filter in the optical system, it is not desirable only to use an ultraviolet ray absorption filter because the skin color of a person becomes yellowish and the sensitivity lowers. To improve them, the present invention specifies characteristics of the stroboscope which is built in the film unit with a lens and of the photosensitive material so as to reproduce an object more faithfully.

Concretely, the object of the present invention is accomplished by the structure that in a film unit with a lens which has a fixed focus, fixed F-number, fixed shutter speed, and built-in stroboscope and is loaded with an unexposed film in the exposable state beforehand, the spectral transmittance rate of the stroboscopic panel of the built-in stroboscope at a wavelength of 410 nm ranges from 10% to 50% and the sensitivity at a wavelength of 410 nm in the blue-sensitive spectral sensitivity distribution of the above film ranges from 70% to 95% of the sensitivity at the maximum blue-sensitive wavelength $lambda_{Bmax}$.

The aforementioned stroboscopic panel is a light transmission panel positioned in front of the stroboscopic light emission tube as shown in FIG. 1 or 2 and often serves as a cover for the light emission tube. The spectral transmittance of this stroboscopic panel ranges from 10% to 50% at a wavelength of 410 nm, desirably from 15% to 40%, or particularly desirably from 20% to 40%. Furthermore, when the spectral transmittance at a wavelength of 420 nm is 50% or more or desirably 65% or more and the spectral transmittance at a wavelength of 400 nm is 20% or less or desirably 10% or less, the present invention obtains good results. To realize the spectral transmittance of the present invention, a transparent glass or plastic panel with the desired spectral transmittance may be used or a substance with the desired spectral transmittance, for example, ultraviolet ray absorber may be added and kneaded in glass or plastic or coated on the panel surface.

According to the present invention, when the sensitivity of an unexposed film (a silver halide color photosensitive material), which is loaded in the exposable state beforehand, at a wavelength of 410 nm in the blue-sensitive spectral sensitivity distribution thereof ranges from 70% to 95% of the sensitivity at the maximum blue-sensitive wavelength $lambda_{Bmax}$, desirably from 75% to 90%, or particularly desirably from 78% to 88%, good results can be obtained. When the sensitivity is more than 95%, the skin color of a person of a printed image becomes bluish. When the sensitivity is less than 70% inversely, the skin color becomes yellowish.

The aforementioned spectral sensitivity distribution is a distribution of the sensitivity at a point with a minimum density of +1.0 (a reciprocal of the exposure ergs/cm$^2$ necessary to obtain a particular density) under the condition equivalent to the status M after a film, which is spectrally exposed, is developed by negative film processing solution C-41 manufactured by Eastman Kodac, Ltd.

To obtain the spectral sensitivity distribution of the present invention, a silver halide color photosensitive material can be processed by the well-known method including selection of silver halide grains, adjustment of the chemical sensitization, selection of a sensitizing dye, selection of a dye, and selection of an ultraviolet ray absorber.

Any of various well-known silver halide color photosensitive material structures may be used for the present invention.

As a silver halide emulsion of the present invention, the one mentioned in Research Disclosure 308119 (hereinafter abbreviated to RD308119) may be used. The description location of each item is shown in the table below.

TABLE 1

| Item | Page of RD308119 |
| --- | --- |
| Iodine organization | Page 933, Item I-A |
| Manufacturing method | Page 933, Item I-A and page 994, Item E |
| Crystal habit | |
| Normal crystal | Page 933, Item I-A |
| Twin | Page 933, Item I-A |
| Epitaxial | Page 933, Item I-A |
| Halogen composition | |
| Uniform | Page 993, Item I-B |
| Not uniform | Page 993, Item I-B |
| Halogen conversion | Page 994, Item I-C |
| Halogen substitution | Page 994, Item I-C |
| Metal inclusion | Page 994, Item I-D |
| Monodispersion | Page 995, Item I-F |
| Solvent addition | Page 995, Item I-F |
| Latent image forming location | |
| Surface | Page 995, Item I-G |
| Inside | Page 995, Item I-G |
| Applicable photosensitive material | |
| Negative | |
| Positive | Page 995, Item I-G |
| (Inner fog grains included) | |
| Emulsion mixed | Page 995, Item I-J |
| Desalting | Page 995, Item II-A |

According to the present invention, silver halide emulsion which is physically ripened, chemically ripened, and spectrally sensitized is used. Additives used in the above processes are mentioned in Research Disclosure Nos. 17643, 18716, and 308119 (hereinafter abbreviated to RD17643, RD18716, and RD308119 respectively).

Description locations are shown in Table 2.

TABLE 2

| Item | Page of RD308119 | RD17643 | RD18716 |
| --- | --- | --- | --- |
| Chemical sensitizer | Page 996, Item III-A | 23 | 648 |
| Spectral sensitizer | Page 996, Items IV-A-A, B, C, D, H, I, and J | 23 to 24 | 648 to 9 |
| Strong color sensitizer | Page 996, Items IV-A-E and J | 23 to 24 | 648 to 9 |
| Antifoggant | Page 998, VI | 24 to 25 | 649 |
| Stabilizer | Page 998, VI | 24 to 25 | 649 |

Well-known photographic additives which can be used for the present invention are also mentioned in Research Disclosure. Related description locations are shown in Table 3.

TABLE 3

| Item | Page of RD308119 | RD17643 | RD18716 |
| --- | --- | --- | --- |
| Color turbidity preventive | Page 1002, Item VII-I | 25 | 650 |
| Dye image stabilizer | Page 1001, Item VII-J | 25 | |
| Whiting agent | Page 998, V | 24 | |
| Ultraviolet ray absorber | Page 1003, Items VIII-C and XIII-C | 25 to 26 | |
| Light absorber | Page 1003, VIII | | |

TABLE 3-continued

| Item | Page of RD308119 | RD17643 | RD18716 |
| --- | --- | --- | --- |
| Light scattering agent | Page 1003, VIII | | |
| Filter dye | Page 1003, VIII | 25 to 26 | |
| Binder | Page 1003, IX | 26 | 651 |
| Static preventive | Page 1006, XIII | 27 | 650 |
| Hardening agent | Page 1004, X | 26 | 651 |
| Plasticizer | Page 1006, XII | 27 | 650 |
| Lubricant | Page 1006, XII | 27 | 650 |
| Activator coating aid | Page 1005, XI | 26 to 27 | 650 |
| Matting agent | Page 1007, XVI | | |
| Developer (contained in photosensitive material) | Page 1011, Item XXB | | |

Various couplers can be used for the present invention. Actual examples are mentioned in Research Disclosure. Related description locations are shown in Table 4.

TABLE 4

| Item | Page of RD308119 | RD17643 |
| --- | --- | --- |
| Yellow coupler | Page 1001, Item VII-D | Items VIIC to VIIG |
| Magenta coupler | Page 1001, Item VII-D | Items VIIC to VIIG |
| Cyan coupler | Page 1001, Item VII-D | Items VIIC to VIIG |
| Color decoupler | Page 1002, Item VII-G | Item VIIG |
| DIR coupler | Page 1001, Item VII-H | Item VIIF |
| BAR coupler | Page 1002, Item VII-F | |
| Other useful remaining discharge coupler | Page 1001, Item VII-F | |
| Alkanline soluble coupler | Page 1001, Item VII-E | |

Additives used for the present invention can be added by the dispersion method mentioned in RD308119.

Supporters mentioned on page 28 of RD17643, on pages 647 and 648 of RD18716, and in Item XIX of RD308119 can be used for the present invention.

For a photosensitive material of the present invention, an auxiliary layer such as the filter layer or intermediate layer mentioned in Item VII-K of RD308119 may be used.

A photosensitive material of the present invention may have various layer structures such as the forward layer, reverse layer, and unit structure which are mentioned in Item VII-K of RD308119.

The present invention may be applied to various exposure color photosensitive materials including general or motion picture color negative films and slide or TV color reversal films and color positive films.

A photosensitive material of the present invention may be developed by the ordinary method mentioned on pages 28 and 29 of RD17643, page 647 of RD18716, and in Item XIX of RD308119.

Figure 6A:
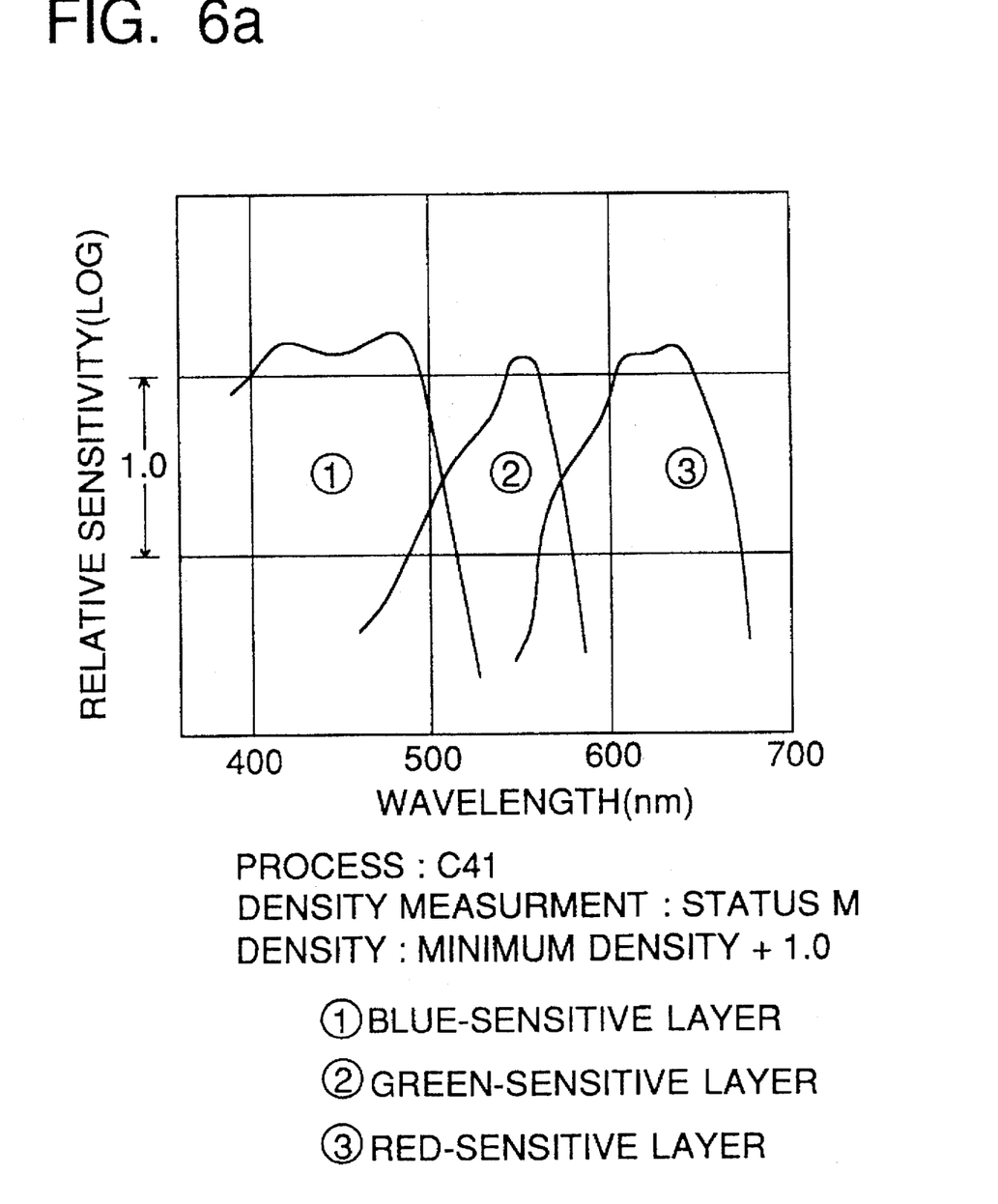
FIGS. 6(a) and 6(b) show examples of spectral sensitivity curves.
Figure 6B:
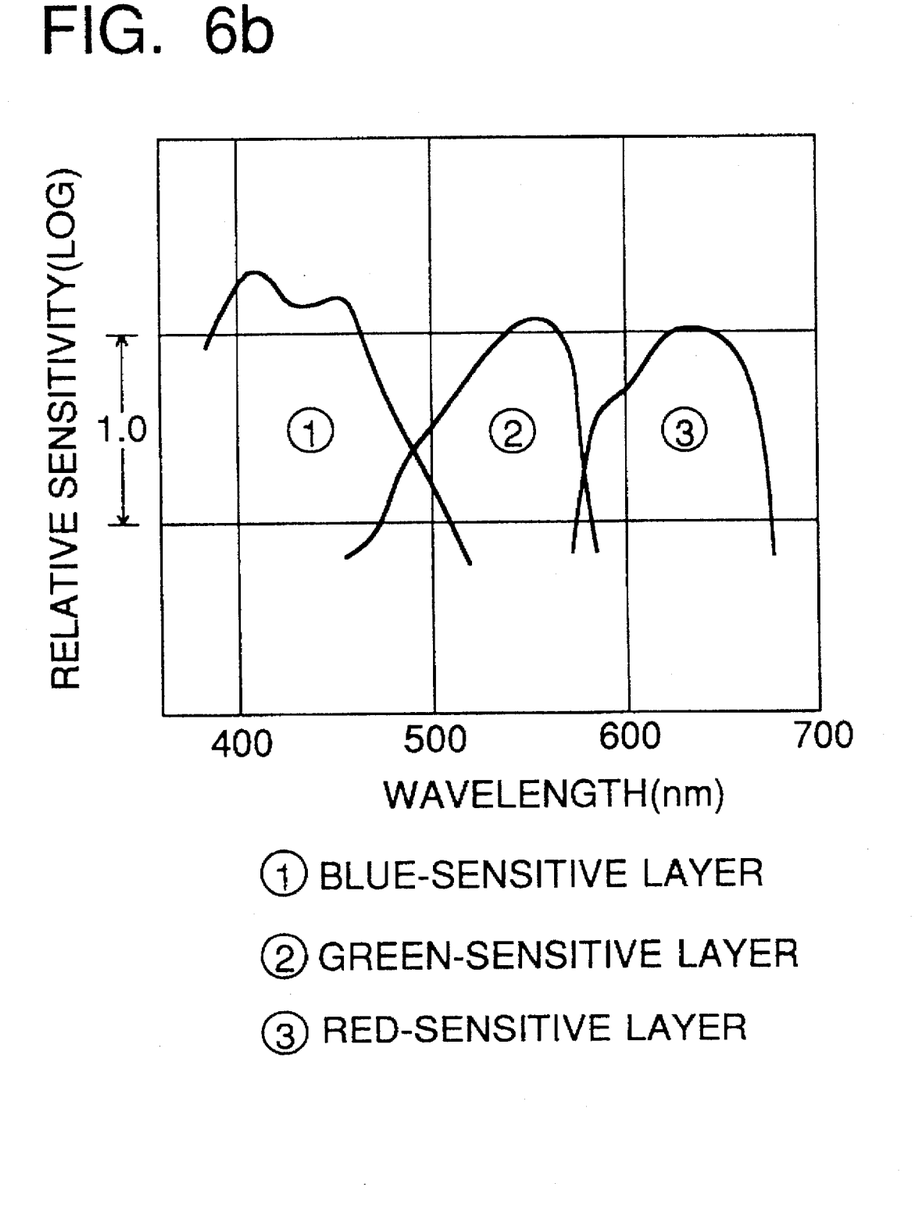

FIG. 6 shows spectral sensitivity curves of a photosensitive material. FIG. 6(a) shows spectral sensitivity curves of preferable example of a photosensitive material example of the present invention and FIG. 6(b) shows spectral sensitivity curves of another example of a photosensitive material example of the invention.

According to the present invention, a film unit with a lens for obtaining photographs with superior image quality which users can be satisfied with, wherein the probability of degradation of color reproduction by stroboscopic photographing is low and the color reproduction including the skin color of a person is excellent.

What is claimed is:

1. A lens-fitted film unit comprising;
 a housing having a front face adapted to face an object to be photographed;
 a viewfinder, having a first view field, mounted on said housing, said viewfinder having a lens with a first optical axis, thereby permitting the viewing of said object;
 a strobe unit having a fixed guide number for emitting strobe light to said object;
 unexposed film in said housing;
 a second lens on said front face, said second lens having a fixed focal length, and a second optical axis different from said first optical axis;
 a fixed diaphragm between said film and said lens, said fixed diaphragm having an aperture permitting an amount of exposure light to pass therethrough;
 a shutter having a fixed shutter speed on said housing, between said object and said film, said shutter regulating an exposure time, an exposure value regulated by said fixed diaphragm and said fixed shutter speed being predetermined in a range of 11 to 13.5; and,
 a picture frame, provided between said unexposed film and said fixed diaphragm for determining a photographed field of an image on said film to be exposed, a finder field ratio of said viewfield to said photographed field on said film being 87% to 120%.

2. The film unit of claim 1, wherein the strobe comprises a light transmission panel having a spectral transmission rate of 10 to 50% at the wavelength of 410 nm.

3. The film unit of claim 2, wherein the sensitivity of the film at the wavelength of 410 nm in blue spectral sensitivity distribution ranges from 70 to 95% of the sensitivity of the film at the maximum blue sensitive wavelength.

4. The lens-fitted film unit of claim 1 wherein a predetermined f-number of said fixed diaphragm is 8.5 to 11.

5. The lens-fitted film unit of claim 1 wherein said predetermined shutter speed is $1/50$ to $1/120$ seconds.

6. The lens-fitted film unit of claim 1 wherein said second lens has a predetermined focal length of 20 mm to 35 mm.

7. The lens-fitted film unit of Claim 1 wherein said predetermined guide number of said strobe is 10 to 15.

8. The lens-fitted film unit of claim 1 wherein said viewfinder has a predetermined magnification of 0.4 to 0.7.

9. The lens-fitted film unit of claim 1 wherein said diaphragm has a predetermined f-number of at least 6.5.

* * * * *